US010552462B1

(12) United States Patent
Hart

(10) Patent No.: US 10,552,462 B1
(45) Date of Patent: Feb. 4, 2020

(54) SYSTEMS AND METHODS FOR TOKENIZING USER-ANNOTATED NAMES

(71) Applicant: Veritas Technologies LLC, Santa Clara, CA (US)

(72) Inventor: Michael Hart, Brooklyn, NY (US)

(73) Assignee: Veritas Technologies LLC, Santa Clara, CA (US)

( * ) Notice: Subject to any disclaimer, the term of this patent is extended or adjusted under 35 U.S.C. 154(b) by 555 days.

(21) Appl. No.: 14/525,864

(22) Filed: Oct. 28, 2014

(51) Int. Cl.
*G06F 16/31* (2019.01)
*G06F 16/35* (2019.01)

(52) U.S. Cl.
CPC ............ *G06F 16/313* (2019.01); *G06F 16/35* (2019.01)

(58) Field of Classification Search
CPC .................... G06F 17/30616; G06F 17/30705
USPC .......................................................... 707/750
See application file for complete search history.

(56) References Cited

U.S. PATENT DOCUMENTS

| 9,691,075 B1* | 6/2017 | Ray | G06Q 30/0201 |
|---|---|---|---|
| 2009/0037448 A1* | 2/2009 | Thomas | H03M 7/3084 |
| | | | 707/999.101 |
| 2009/0193018 A1* | 7/2009 | Ren | G06F 17/30616 |
| | | | 707/999.005 |
| 2010/0023514 A1* | 1/2010 | Parikh | G06F 17/2735 |
| | | | 707/E17.001 |
| 2010/0114879 A1* | 5/2010 | Zhong | G06F 17/278 |
| | | | 707/723 |
| 2011/0035211 A1* | 2/2011 | Eden | G06F 17/30864 |
| | | | 704/10 |
| 2011/0202330 A1* | 8/2011 | Dai | G06F 17/2755 |
| | | | 704/2 |
| 2011/0208513 A1* | 8/2011 | Nicks | G06F 17/2705 |
| | | | 704/10 |
| 2012/0323921 A1* | 12/2012 | Chen | G06F 17/30616 |
| | | | 707/740 |
| 2013/0318098 A1* | 11/2013 | Chan | G06Q 50/01 |
| | | | 707/748 |
| 2014/0283033 A1* | 9/2014 | Anand | H04L 63/1416 |
| | | | 726/22 |
| 2016/0117522 A1* | 4/2016 | Bhagwan | G06F 21/6245 |
| | | | 726/28 |

* cited by examiner

*Primary Examiner* — Pierre M Vital
*Assistant Examiner* — Alicia M Antoine
(74) *Attorney, Agent, or Firm* — FisherBroyles, LLP

(57) ABSTRACT

A disclosed computer-implemented method for tokenizing user-annotated names may include (1) identifying an example set of user-annotated names, (2) creating a custom dictionary that includes known keywords by (a) extracting a set of known keywords from the example set of user-annotated names and (b) assigning a frequency score to each known keyword in the set of known keywords based on the respective frequency of each known keyword within the example set, and (3) enabling the computing device to tokenize an additional user-annotated name of arbitrary structure by performing a semantic analysis including (a) assigning, using the custom dictionary, a frequency score to a substring of the additional user-annotated name based on the substring matching the known keyword and (b) splitting the additional user-annotated name into tokens according to a permutation of substrings that received a top combined frequency score. Various other methods, systems, and computer-readable media are also disclosed.

20 Claims, 9 Drawing Sheets

SYSTEMS AND METHODS FOR TOKENIZING USER-ANNOTATED NAMES

BACKGROUND

Organizations and individuals frequently use metadata tags to assist in the categorization of digital information. Users frequently create metadata tags, which can include anything from file names to ID3 tags for mp3 files, by concatenating multiple keywords together. The users may similarly rely on metadata tags as "road signs" to aid them in determining which folders, files, or network nodes contain the information or services they are searching for. Organizations and individuals often use internally consistent conventions when creating metadata tags.

Nevertheless, the conventions used by a given organization or individual may not match the conventions used by another organization or individual. Further, the structure of metadata tags may not follow the typical tokenization of a natural language such as English. Traditional procedures may rely on matching a user-provided substring to the corpus being searched rather than treating a text string as a collection of meaningful terms. For example, traditional procedures may depend on a fixed spacing and/or capitalization within a substring to detect a substring match. Accordingly, it may be difficult or impossible to accurately search or automatically categorize items according to their metadata tags (e.g., if the metadata tags use keywords according to different capitalization and/or spacing conventions). Accordingly, the instant disclosure identifies and addresses a need for additional and improved systems and methods for tokenizing user annotated names.

SUMMARY

As will be described in greater detail below, the instant disclosure describes various systems and methods for tokenizing user-annotated names by, for example, analyzing an example set of user-annotated names to produce a custom tokenization dictionary, and using the custom dictionary to perform a semantic analysis on additional user-annotated names. In one example, a method for tokenizing user-annotated names may include (1) identifying an example set of user-annotated names stored in metadata, (2) creating a custom dictionary that includes known keywords by (a) extracting a set of known keywords from the example set of user-annotated names stored in metadata and (b) assigning a frequency score to each known keyword in the set of known keywords based on the respective frequency of each of the known keywords within the example set, and (3) enabling a computing device to tokenize an additional user-annotated name of arbitrary structure by performing a semantic analysis including (a) assigning, using the custom dictionary, a frequency score for a known keyword to a substring of the additional user-annotated name based on the substring matching the known keyword and (b) splitting the additional user-annotated name into tokens according to a permutation of substrings that received a top combined frequency score.

The custom dictionary may be generated in a variety of ways. In some examples, creating the custom dictionary that includes known keywords may further include splitting each entry in the example set of user-annotated names stored in metadata along hard delimiters into preliminary keywords. In one embodiment, the hard delimiters may include (e.g., only include) non-alphanumeric characters. In other examples, creating the custom dictionary that includes known keywords may include adding preliminary keywords that match a regular expression to the custom dictionary that includes known keywords. In one embodiment, the regular expression may define at least one of the following sequences: (1) all alphanumeric capital letters, (2) all alphanumeric lowercase letters, and/or (3) a single alphanumeric capital letter followed by a series of alphanumeric lowercase letters.

In other embodiments, creating the custom dictionary that includes known keywords may further include identifying an additional dictionary that contains known keywords. In some examples, assigning, using the custom dictionary, a frequency score for a known keyword to a substring of the additional user-annotated name may further include applying a weighted interpolation function to merge the frequency scores for the known keyword from the custom dictionary and the additional dictionary into a merged frequency score. In other examples, the additional dictionary that includes known keywords may include one of: (1) a natural language dictionary, (2) a dictionary of user-defined known keywords, and/or (3) a previously generated custom dictionary of known keywords.

In some examples, splitting the additional user-annotated name into tokens may include applying a function to a substring that uses a previous output of the function as an input to the function. In one embodiment, the semantic analysis may include assigning a penalty score as the frequency score of a substring that is not found in the custom dictionary that includes known keywords.

In one embodiment, a system for implementing the above-described method may include (1) an identification module, stored in memory, that identifies an example set of user-annotated names stored in metadata, (2) a dictionary creation module, stored in memory, that creates a custom dictionary that includes known keywords by (a) extracting a set of known keywords from the example set of user-annotated names stored in metadata and (b) assigning a frequency score to each known keyword in the set of known keywords based on the respective frequency of each of the known keywords within the example set, (3) a tokenizing module, stored in memory, that enables a computing device to tokenize an additional user-annotated name of arbitrary structure by performing a semantic analysis including (a) assigning, using the custom dictionary, a frequency score for a known keyword to a substring of the additional user-annotated name based on the substring matching the known keyword and (b) splitting the additional user-annotated name into tokens according to a permutation of substrings that received a top combined frequency score, and (4) at least one physical processor configured to execute the identification module, the dictionary creation module, and the tokenizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an example set of user-annotated names stored in metadata, (2) create a custom dictionary that includes known keywords by (a) extracting a set of known keywords from the example set of user-annotated names stored in metadata and (b) assigning a frequency score to each known keyword in the set of known keywords based on the respective frequency of each of the known keywords within the example set, and (3) enable tokenization of an additional user-annotated name of arbitrary structure by performing a semantic analysis including (a) assigning, using the custom dictionary, a frequency score for a known keyword to a substring of the additional user-annotated name based on the substring matching the known keyword and (b) splitting the additional user-annotated name into tokens according to a permutation of substrings that received a top combined frequency score.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
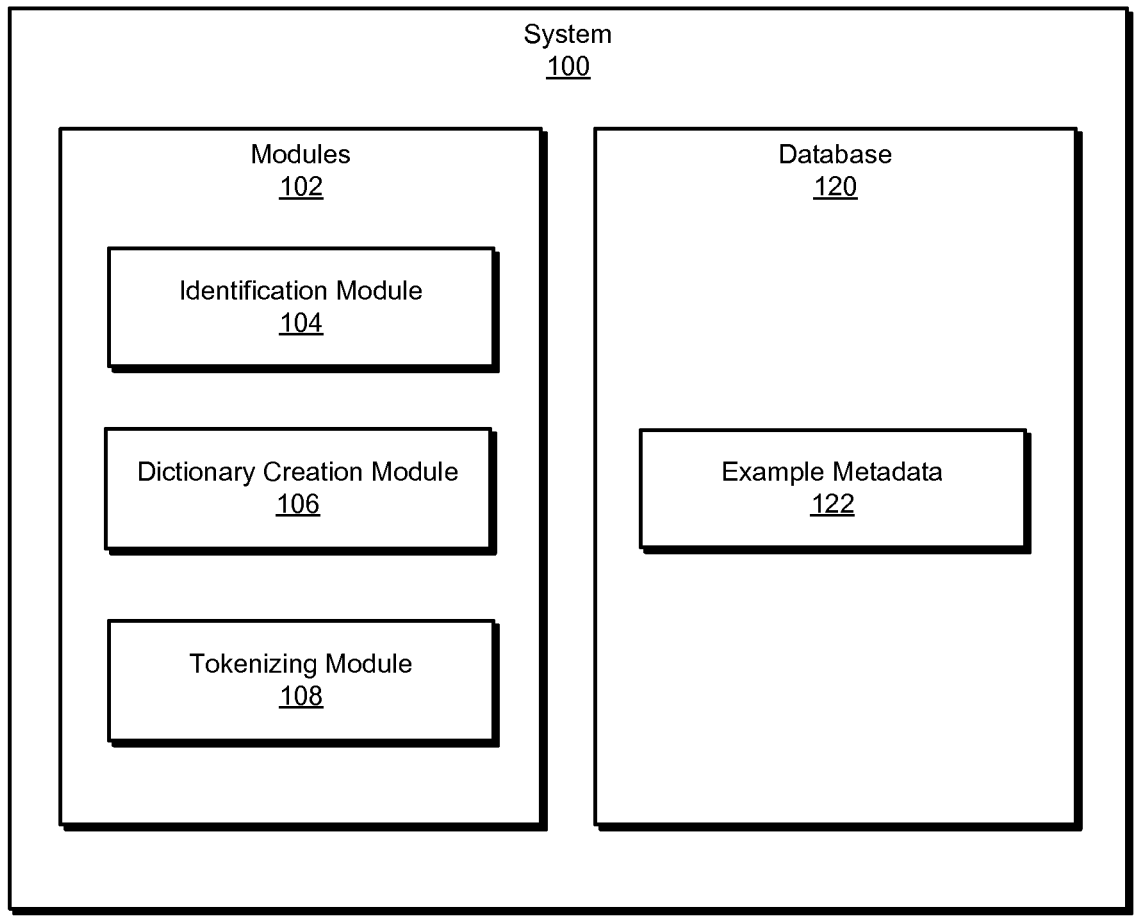
FIG. 1 is a block diagram of an exemplary system for tokenizing user-annotated names.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for tokenizing user-annotated names. As will be explained in greater detail below, by creating a customized dictionary based on an analysis of a set of example data, the systems and methods described herein may enable a computing device to tokenize user annotations regardless of the underlying conventions being used to generate the annotations. Such automated tokenization may be used in a variety of ways, including, without limitation, enhancement of search functions, automated "tagging" of social media, and/or improved speech-to-text functions.

Figure 2:
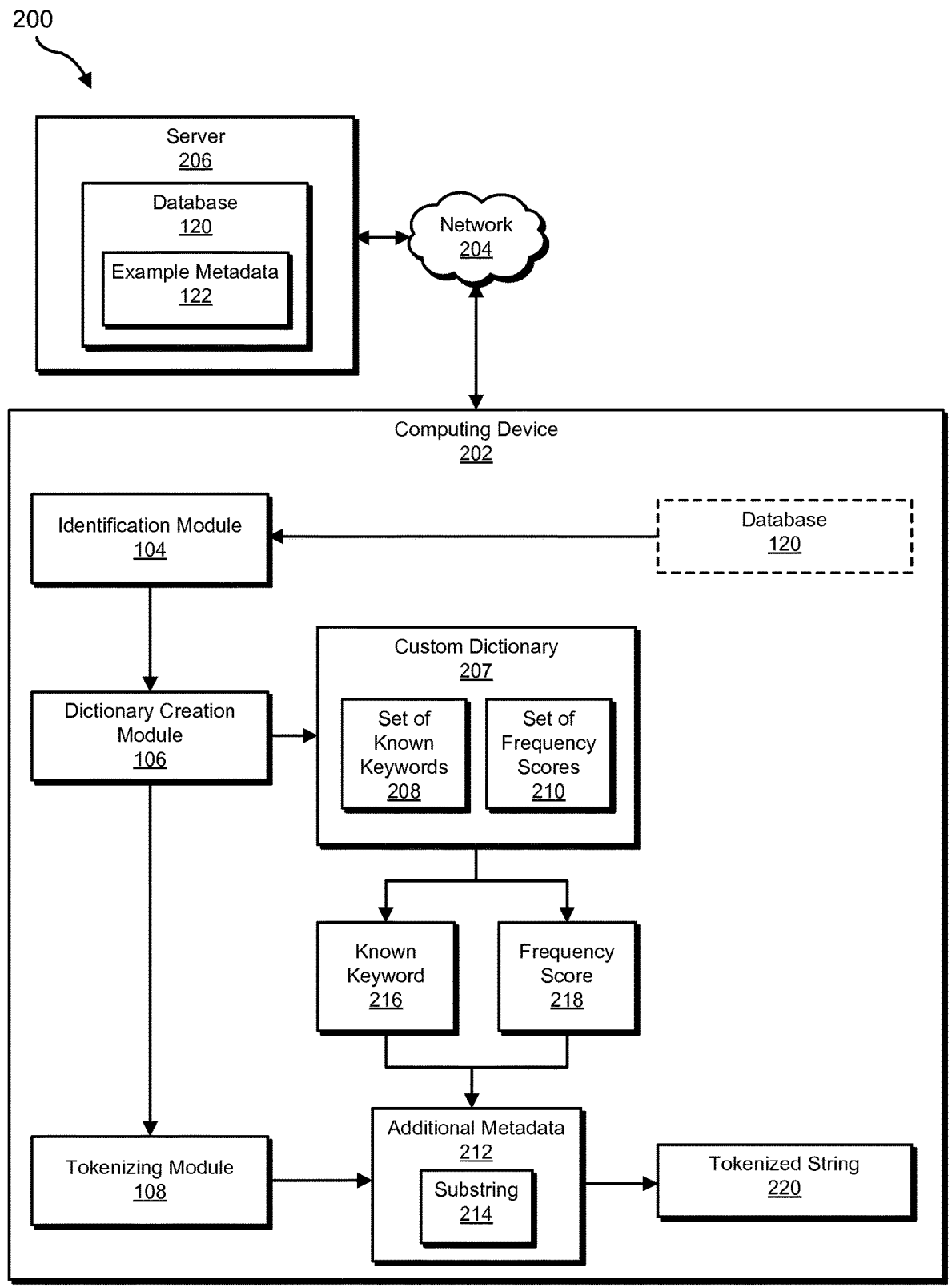
FIG. 2 is a block diagram of an additional exemplary system for tokenizing user-annotated names.

The following will provide, with reference to FIGS. 1-2, detailed descriptions of exemplary systems for tokenizing user-annotated names. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for tokenizing user-annotated names. As illustrated in this figure, exemplary system 100 may include one or more modules 102 for performing one or more tasks. For example, and as will be explained in greater detail below, exemplary system 100 may include an identification module 104 that may identify an example set of user-annotated names stored in metadata. Exemplary system 100 may additionally include a dictionary creation module 106 that may create a custom dictionary that includes known keywords by (a) extracting a set of known keywords from the example set of user-annotated names stored in metadata, and (b) assigning a frequency score to each known keyword in the set of known keywords based on the respective frequency of each of the known keywords within the example set. Exemplary system 100 may further include a tokenizing module 108 that may enable the computing device to tokenize an additional user-annotated name of arbitrary structure by performing a semantic analysis including (a) splitting the additional user-annotated name into tokens according to a permutation of substrings that received a top combined frequency score, and (b) splitting the additional user-annotated name into tokens according to a permutation of substrings that received a top combined frequency score. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may include one or more databases, such as database 120. In one example, database 120 may be configured to store example metadata 122, which may include an example set of user-annotated names (e.g., file names, directory names, device names, node names, virtual machine names, etc.), as discussed further below. Database 120 may represent portions of a single database or computing device, or a plurality of databases or computing devices. For example, database 120 may represent a portion of server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to separate elements of metadata into tokens. For example, and as will be described in greater detail below, one or more of modules 102 may cause computing device 202 and/or server 206 to tokenize user-annotated names. For example, and as will be described in greater detail below, identification module 104 may identify example metadata 122 that is stored within database 120. Dictionary creation module 106 may create a custom dictionary 207 by extracting a set of known keywords 208 from example metadata 122. Dictionary creation module 106 may assign a set of frequency scores 210 to set of known keywords 208 based on the respective frequency of each of the known keywords within the example set. Tokenizing module 108 may enable computing device 202 to tokenize additional metadata 212 by performing a semantic analysis that involves matching, using custom dictionary 207, a substring 214 within additional metadata 212 to a known keyword 216 found in custom dictionary 207. Keyword 216 may be associated with a frequency score 218 as part of custom dictionary 207. Tokenizing module 108 may, as a result of matching substring 214 to known keyword 216, use frequency score 218 as part of calculating the optimal way to split additional metadata 212 into a tokenized string 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of storing information in a text-based format. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
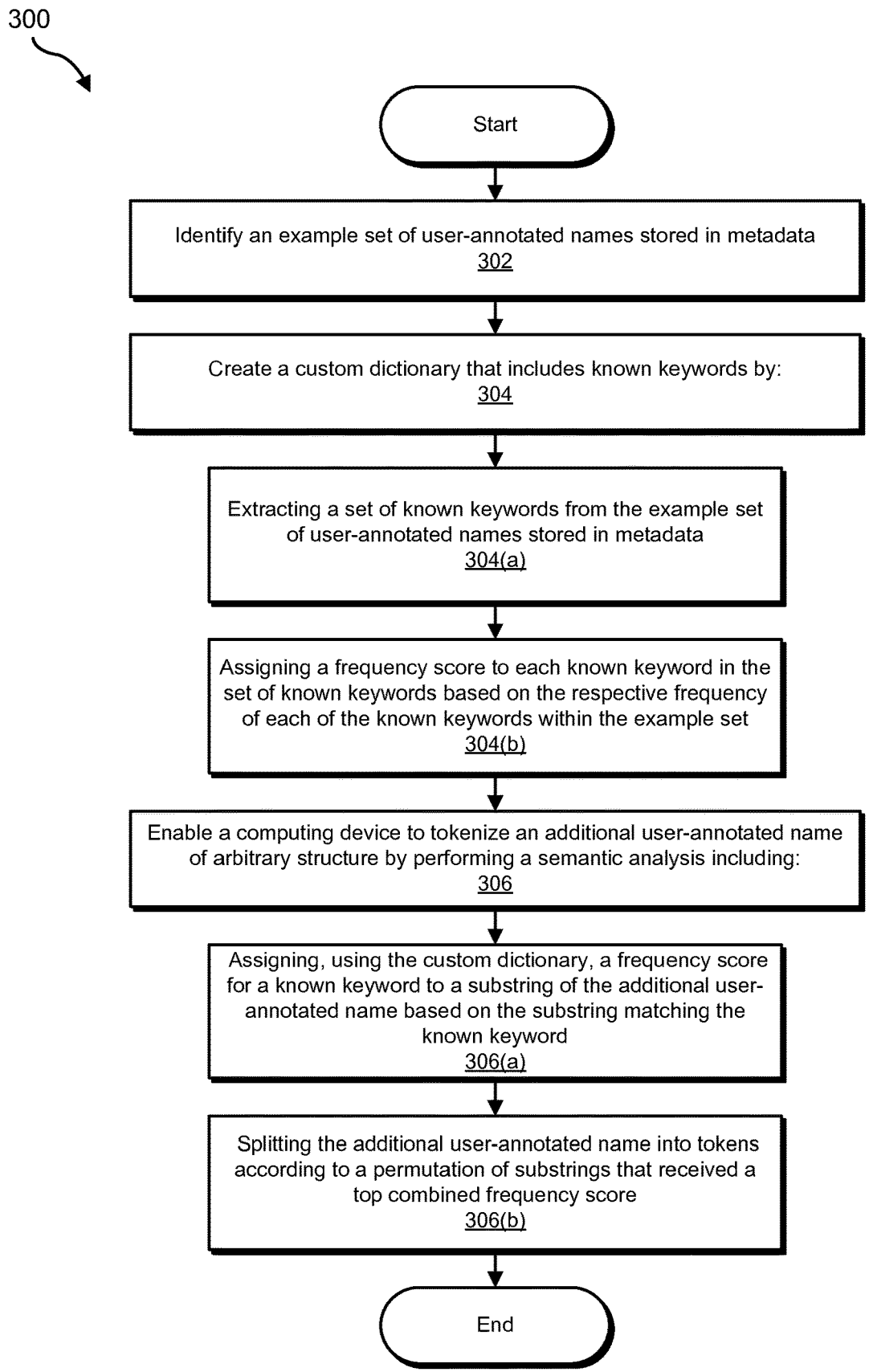
FIG. 3 is a flow diagram of an exemplary method for tokenizing user-annotated names.

FIG. 3 is a flow diagram of an exemplary computer-implemented method 300 for tokenizing user-annotated names. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may identify an example set of user-annotated names stored in metadata. For example, identification module 104 may, as part of computing device 202 in FIG. 2, identify example metadata 122 that is stored in database 120 and hosted on server 206.

The term, "user-annotated name," as used herein, generally refers to any form of text used to label a file, folder, node, device, layer, and/or similar digital entity to provide information about the entity. Examples of user-annotated names may include, without limitation, e-mail subject lines, folder names, file names, components of ID3 tags for MP3 files, UNIFORM RESOURCE LOCATOR (URL) links, names of elements within a MICROSOFT ACTIVE DIRECTORY, network node names (e.g., the network name of a computer, router, or printer that is part of a network), hardware device names, virtualized device/layer names, or any other suitable form of text, string, and/or tag.

Identification module 104 may identify an example set of metadata in a variety of ways and/or contexts. In one example, identification module 104 may identify a database, folder, volume, and/or disk that stores user-annotated names. The user-annotated names may have been previously extracted from the digital entities that they name. Alternatively, identification module 104 may extract the user-annotated names (e.g., storing them in a list or database table) based on an underlying store of named digital entities. For example, identification module 104 may extract a set of (e.g., all) user-annotated names from any permutation of files, e-mails, folders, drives, volumes, devices, nodes, and/or web-based content stored within, or identified within, a memory or memories and/or a set of location(s) and/or storage container(s) (which may itself be named).

In another example, identification module 104 may prompt a user to designate a MICROSOFT ACTIVE DIRECTORY as an example set of user-annotated names, and may identify user-annotated names associated with elements within the MICROSOFT ACTIVE DIRECTORY. In other examples, identification module 104 may be part of an intelligent search function. In these examples, identification module 104 may identify a set of folder and/or file names as the example set of metadata without prompting the user to designate the location of an example set of metadata.

Returning to FIG. 3 at step 304, one or more of the systems described herein may create a custom dictionary that contains known keywords by (a) extracting a set of known keywords from the example set of user-annotated names stored in metadata and (b) assigning a frequency score to each known keyword in the set of known keywords based on the respective frequency of each of the known keywords within the example set. For example, dictionary creation module 106 may, as part of computing device 202 in FIG. 2, create custom dictionary 207 that includes known keywords by (a) extracting set of known keywords 208 from the example set of user-annotated names stored in metadata and (b) assigning a frequency score, from set of frequency scores 210, to each known keyword in set of known keywords 208 based on the respective frequency of each of the known keywords within the example set.

The term, "keyword," as used herein, generally refers to an informative word or token that is used as part of an information retrieval system to specify information about an underlying digital object. Important keywords may appear with significantly greater frequency within a corpus than other substrings. For example, "ADMIN" may constitute a keyword, whereas "ADcS3;Z" may instead constitute a nonsense or random composition of text. The keyword "ADMIN" may indicate that an underlying file, folder, and/or device (or other entity) is related to administrative functions within an organization. Notably, organizations and individuals may develop their own keywords, which may not necessarily be present, or emphasized, within traditional general-purpose dictionaries. The systems and methods described herein may nevertheless identify and extract these special keywords and use them to improve search and other functionality, as discussed below.

Various systems and methods described herein may differentiate between "preliminary keywords" versus "known keywords." The term, "preliminary keywords," as used herein, generally refers to keywords that have been extracted from an example set of user-annotated names, but have not yet been conclusively made a member of a dictionary. Moreover, the term, "known keywords," as used herein, generally refers to keywords that have been conclusively made a member of a dictionary. In some examples, systems and methods described herein may accept and store preliminary keywords as known keywords without additional processing or analysis. In other examples, systems and methods described herein may filter, analyze, sort, or otherwise process a set of preliminary keywords prior to saving them in a dictionary.

The term, "dictionary," as used herein, generally refers to a set of tokens that are stored in a collection. A dictionary may optionally include frequency values for each of the words stored within the dictionary. Examples of a dictionary may include a user-defined set of words, an automatically generated collection of tokens, a standard dictionary such as an English language dictionary, or any other suitable collection of tokens.

The term, "token," as used herein, generally refers to a portion of text that provides its own meaning beyond the letters or substrings that compose it. Tokens are frequently atomic or indivisible, and relatively short in length. By analogy, the words in an English language dictionary are generally atomic or indivisible, although some words are compound words. A token may be a word, phrase, symbol, or any other meaningful element of text. Tokens are typically separated from each other by delimiters. Tokens may also be combined or concatenated in various ways and using various conventions (e.g., various capitalization, paraphrasing, abbreviating, concatenating, delimiting, and/or spacing conventions) to form compound tokens.

The term, "delimiter," as used herein, generally refers to a text element that designates a meaningful separation between tokens. Examples of delimiters may include spaces, line breaks, other whitespace characters, colons, periods, underscores, hyphens, and/or any other suitable punctuation. Moreover, the term, "hard delimiter," as used herein, generally refers to any non-alphanumeric delimiter. Examples of hard delimiters may include hyphens, periods, parentheses, underscores, or any other non-alphanumeric character.

With reference to FIG. 3, dictionary creation module 106 may, as part of step 304(a), extract a set of known keywords from the example set of user-annotated names stored in metadata in a variety of ways and/or contexts. In some embodiments, dictionary creation module 106 may split each entry in the example set of user-annotated names along hard delimiters into preliminary keywords. In some examples, the hard delimiters only include non-alphanumeric characters. For example, and as will be explained in further detail below, dictionary creation module 106 may split entries contained in example metadata 122 along hard delimiters to produce preliminary keywords.

Figure 5:
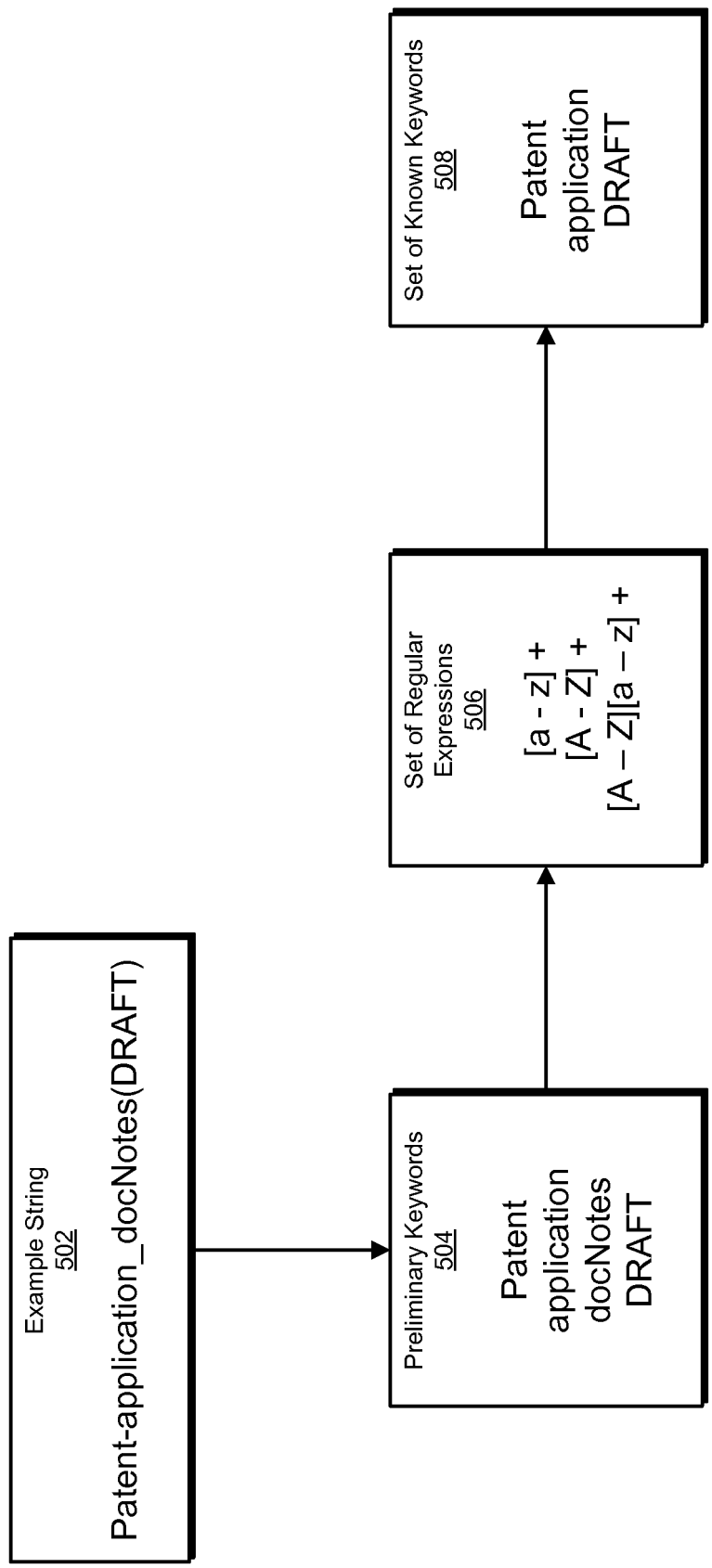
FIG. 5 is a block diagram of an exemplary work flow for applying a series of regular expressions to a set of preliminary keywords derived from an example set of user-annotated names.

In some cases, dictionary creation module 106 may accept the preliminary keywords as known keywords without further analysis and store the keywords in the custom dictionary. In other examples, dictionary creation module 106 may filter the preliminary keywords with one or more regular expressions before storing them in the custom dictionary. In one embodiment, the regular expression(s) may define one of the following sequences: (1) all alphanumeric capital letters, (2) all alphanumeric lowercase letters, and/or (3) a single alphanumeric capital letter followed by a series of alphanumeric lowercase letters. In some examples, dictionary creation module 106 may use a set of regular expressions as illustrated in FIG. 5 and discussed in further detail below.

The term, "regular expression," as used herein, generally refers to a specialized text string that defines a pattern of text characters. The term, "regular expression," may sometimes be abbreviated as "regex" or "regexp," or referred to as a "rational expression." Each character in a regular expression may be considered to be either a character that may provide special meaning or a regular character with its literal meaning.

Figure 4:
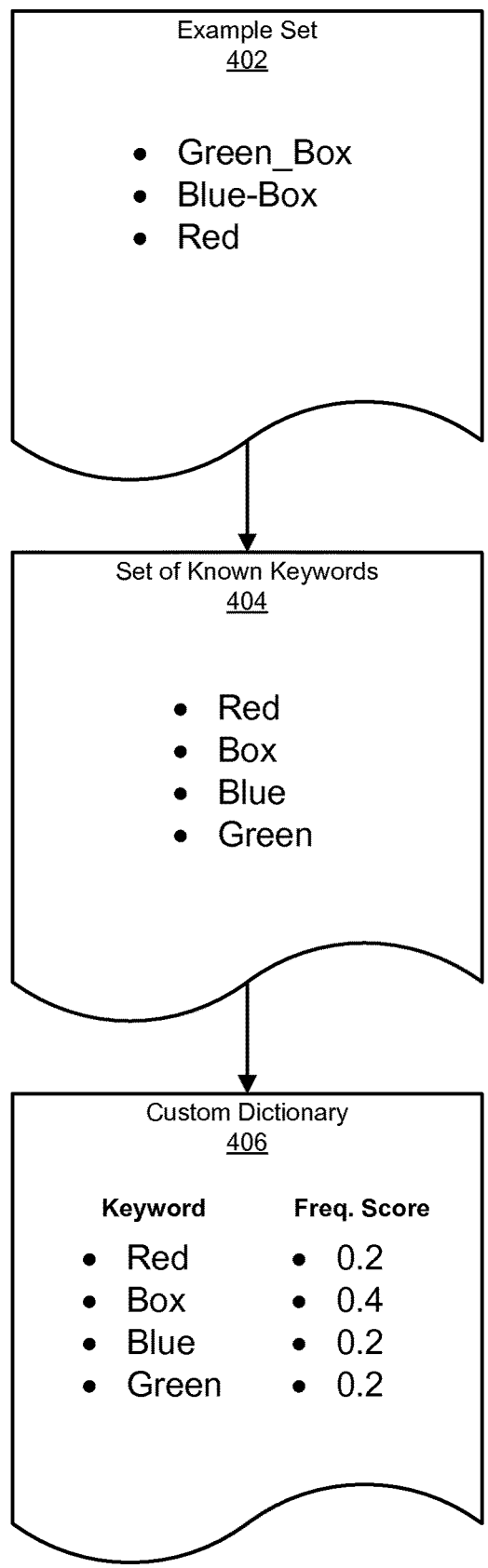
FIG. 4 is a block diagram of an exemplary work flow for deriving a custom dictionary from an example set of user-annotated names.

In some embodiments, and with reference to FIG. 4, dictionary creation module 106 may receive an example set 402 from identification module 104. In the example of FIG. 4, example set 402 contains the user-annotated names, "Green_Box," "Blue-Box," and "Red." Dictionary creation module 106 may extract a set of known keywords 404 from example set 402, and store the results in custom dictionary 406. A known keyword may be extracted from an example set of user-annotated names more than once. For example, the keyword, "Box," may be extracted from example set 402 twice. Accordingly and as will be explained in greater detail below, a custom dictionary may retain frequency scores for each keyword stored within the dictionary. For example, custom dictionary 406 retains frequency scores for each unique keyword originally extracted from example set 402. In the example of FIG. 4, dictionary creation module 106 extracts a total of five keywords ("Green," "Blue," two instances of "Box," and "Red"), only four of which are unique ("Green," Blue," "Box," and "Red"). In FIG. 4, the preliminary keywords extracted from example set 402 were accepted as set of known keywords 404 without further processing, but some embodiments may include applying a set of regular expressions to a set of preliminary keywords prior to accepting them as known keywords, as will be described in further detail below.

As part of step 304(b), dictionary creation module 106 may assign a frequency score to each known keyword in the set of known keywords based on the respective frequency of each of the known keywords within the example set. For example, dictionary creation module 106 may assign frequency scores to each keyword stored within custom dictionary 406 based on the keywords extracted from example set 402.

The term, "frequency score," as used herein generally refers to a value or other score that specifies or indicates (e.g., is based on) the absolute or relative frequency of a known keyword within a set of keyword instances (e.g., from an example set from which the keyword instances are extracted). In some examples, a frequency score may be calculated by dividing the number of occurrences of a keyword within the example set by the total number of keyword instances extracted from the example set. Similarly, the term "combined frequency score" generally refers to a frequency score based on multiple underlying frequency scores.

With continuing reference to FIG. 4, dictionary creation module 106 may account for multiple appearances of a known keyword by assigning a frequency score to each known keyword based on the number of times the known keyword is extracted from the example set. In some embodiments, the numerator of the frequency score may be the number of times the known keyword appears within a set of known keywords, and the denominator may be the total number of keyword instances extracted from the example set. For example, and as illustrated in FIG. 4, dictionary creation module 106 extracted a total of five keyword instances from the example set ("Box" was extracted twice). Accordingly, dictionary creation module 106 may calculate frequency scores in this example using five as the denominator. The keyword, "Red," appears once in example set 402. Dictionary creation module 106 may therefore assign a frequency score of ⅕, or 0.2, in custom dictionary 406. Likewise, "Blue" and "Green" each appear once within example set 402, and dictionary creation module 106 may similarly assign a frequency score of 0.2 to each. The keyword, "Box," appears twice within example set 402 and may accordingly be assigned a frequency score of ⅖, or 0.4, in custom dictionary 406.

Returning to FIG. 3 at step 304(a), dictionary creation module 106 may extract a set of known keywords from an example set in a variety of ways. In some embodiments, dictionary creation module 106 may break an example string along hard delimiters into preliminary keywords. Dictionary creation module 106 may additionally apply a set of regular expressions to the preliminary keywords before accepting them as known keywords.

With reference to FIG. 5, identification module 104 may identify a set of example metadata containing an example string 502 ("Patent-application_docNotes(DRAFT)"). Dictionary creation module 106 may break example string 502 along hard delimiters into preliminary keywords 504 ("Patent", "application", "docNotes", and "DRAFT"). Dictionary creation module 106 may then apply a set of regular expressions 506 to preliminary keywords 504, and discard keywords that do not match the set of regular expressions 506 to yield a set of known keywords 508. In the example of FIG. 5, set of regular expressions 506 will match a string of characters that fits one of three conditions: the string is composed of all lowercase letters; the string is composed of all uppercase letters; or the string is composed of a single uppercase character followed by a series of lowercase letters. Note that the preliminary keyword, "docNotes," contains a series of lowercase letters, then a single uppercase letter followed by a series of lowercase letters. This pattern does not match any case presented by set of regular expressions 506. The string "docNotes" is accordingly discarded and not used in set of known keywords 508. The other three preliminary keywords ("Patent," "application," "DRAFT") each match at least one of the regular expressions in set of regular expressions 506, and are accordingly used in set of known keywords 508.

It may happen that some nonsensical preliminary keywords may nevertheless match the set of regular expressions. For example, dictionary creation module 106 may extract a nonsensical term, such as "HRAPPS," from a string in the example set, and accept "HRAPPS" as a valid known keyword even after filtering it through a set of regular expressions. However, such keywords may have low frequency scores compared to "useful" keywords. For example, dictionary creation module 106 may extract many instances of keywords such as "HR" or "APPS" from other strings in the example set. Accordingly, and as will be explained in greater detail below, nonsensical terms may generally remain unused in breaking additional user-annotated names into tokens due to their low frequency scores.

Additionally or alternatively, dictionary creation module 106 may create the custom dictionary of known keywords by identifying an additional dictionary that contains known keywords. In some embodiments, the additional dictionary that includes known keywords may include one of: (1) a natural language dictionary, (2) a dictionary of user-defined known keywords, or (3) a previously generated custom dictionary of known keywords. In some examples, systems described herein may utilize a weighted interpolation function, as described in greater detail below, to merge frequency scores from entries for a keyword found in two or more dictionaries into a combined frequency score. In some embodiments, dictionary creation module 106 may use the interpolation function to calculate frequency scores for keywords as part of creating a merged dictionary that contains the keywords from two or more dictionaries.

Returning to FIG. 3 at step 306, one or more of the systems described herein may enable a computing device to tokenize an additional user-annotated name of arbitrary structure by performing a semantic analysis that includes (a) assigning, using the custom dictionary, a frequency score for a known keyword to a substring of the additional user-annotated name based on the substring matching the known keyword, and (b) splitting the additional user-annotated name into tokens according to a permutation of substrings that received a top combined frequency score. In some examples, the permutation of substrings that received a top combined frequency score may include the substring that matched the known keyword. For example, tokenizing module 108 may, as part of computing device 202 in FIG. 2, enable computing device 202 to tokenize an additional user-annotated name of arbitrary structure by performing a semantic analysis that includes (a) assigning, using custom dictionary 207, frequency score 218 for known keyword 216 to substring 214 of additional metadata 212 based on substring 214 matching known keyword 216, and (b) splitting additional metadata 212 into tokenized string 220 according to a permutation of substrings that received a top combined frequency score.

The phrase, "user-annotated name of arbitrary structure," as used herein, generally refers to a user-annotated name that has been created in a fashion that may or may not adhere to any particular structure or convention. In general, a user-annotated name of arbitrary structure may be any collection or string of characters, regardless of capitalization, spacing, punctuation, or any other conventions generally used to generate a text string. The string, "CamelCase", may be an example of a user-annotated name that follows the "camelcase" convention. In other examples, a user-annotated name of arbitrary structure may not follow any commonly known structure or convention.

As part of step 306(a) from FIG. 3, tokenizing module 108 may assign a combined frequency score to a substring of a user-annotated name based on the frequency scores of substrings of the user-annotated name. In some embodiments, tokenizing module 108 may assign a penalty score as the frequency score of a substring that is not found in the custom dictionary that contains known keywords. In some examples, the penalty score may take the form of a negative frequency score. In other examples, the penalty score may be calculated by the function:

$$\frac{1}{S * (n^{term\,length})}$$

where S is the number of term instances extracted from the example set, and n is a positive real number. In further examples, the penalty score may be a user-defined value. In general, a penalty score may be thought of as a "placeholder score" that may be defined to facilitate semantic analysis of a string. A penalty score generally causes a reduction in an overall combined frequency score.

Combined frequency scores may be calculated in a variety of ways. In general, a combined frequency score for a string may be a function of the frequency scores for (non-overlapping) substrings of the string. In some embodiments, tokenizing module 108 may add the frequency scores for the substrings together in order to produce the final combined frequency score. In other embodiments, tokenizing module 108 may multiply the combined frequency score for the optimal solution of one side of a split by the frequency (e.g., dictionary lookup) score of the other side of the split, as discussed further below for FIG. 7. Tokenizing module 108 may on some occasions attempt to calculate a frequency score for an empty string (i.e., " "). In these cases, tokenizing module 108 may use a predetermined or user-defined value for the frequency score of the empty string. In general, tokenizing module 108 may calculate a combined frequency score as the output of any algebraic, boolean, and/or business logic function that takes one or more frequency scores as inputs.

Figure 6:
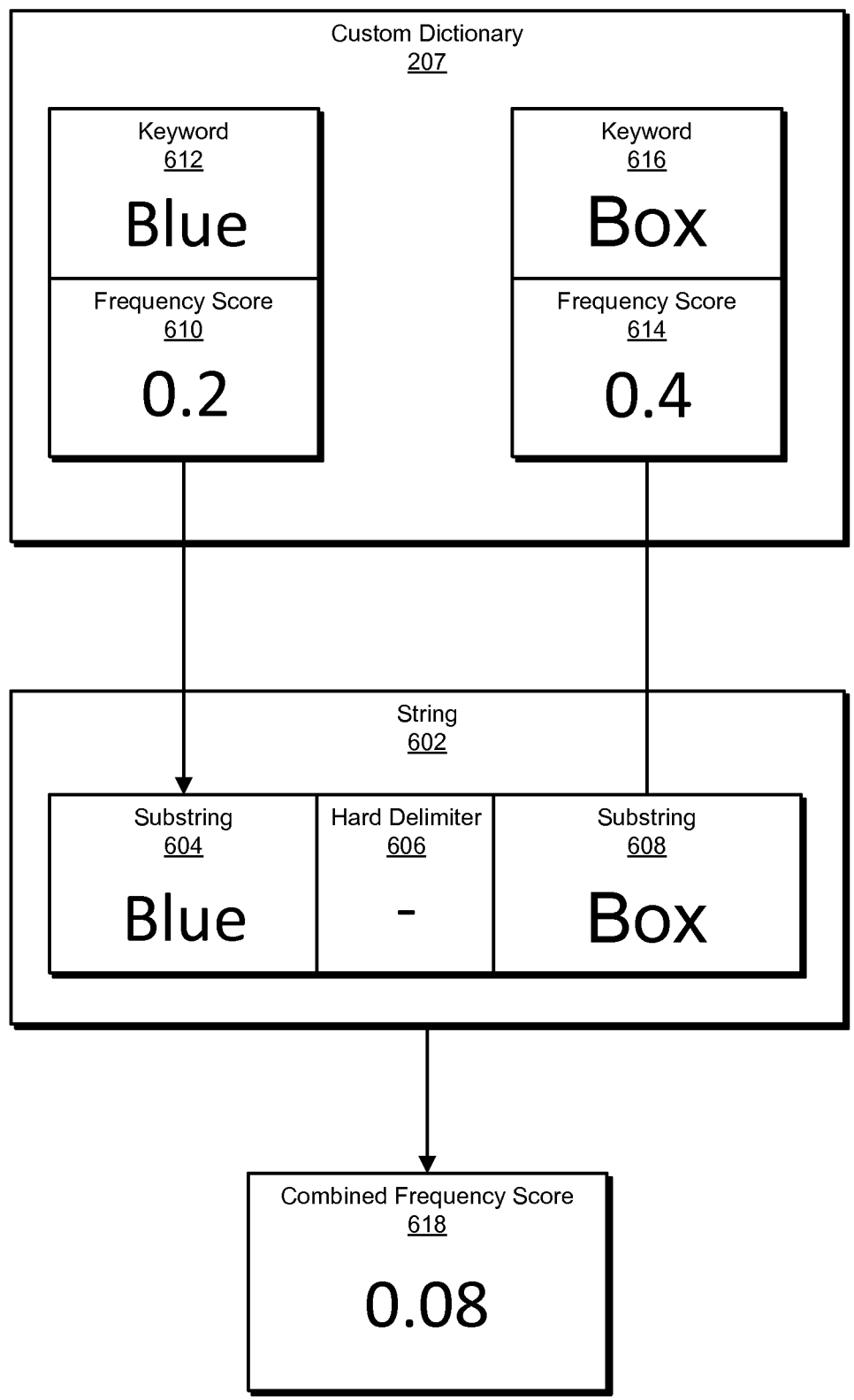
FIG. 6 is a block diagram of an exemplary work flow for calculating the combined frequency score of a set of substrings as part of tokenizing user-annotated names.

In one example, and with reference to FIG. 6, tokenizing module 108 may attempt to tokenize a string 602. String 602 may contain two substrings, a substring 604 ("Blue") and a substring 608 ("Box"), separated by a hard delimiter 606. Tokenizing module 108 may match substring 604 to an entry for a keyword 612 in custom dictionary 207 (e.g., by finding the entry for "Blue" in custom dictionary 207), and accordingly assign a frequency score 610 to substring 604. Tokenizing module 108 may repeat this process for substring 608, matching substring 608 to a keyword 616, and accordingly assigning a frequency score 614 to substring 608. Accordingly, tokenizing module 108 may multiply frequency score 610 (i.e., 0.2) by frequency score 614 (i.e., 0.4) to calculate a combined frequency score 618 (i.e., 0.08) that corresponds to a tokenization of string 602 that contains substring 604 and substring 608.

In some examples, tokenizing module 108 may split an additional user-annotated name into tokens by applying a function that uses a previous output of the function as an input to the next step in the function. In some embodiments, the function may be organized in a "top-down", or recursive, fashion wherein the function calls itself until a base case is reached. In other embodiments, the function may be organized in a "bottom-up", or iterative, fashion wherein the function may iterate through possible scenarios, store the results of a calculation at each step, and refer back to the stored results as part of performing a calculation. In some examples, the iterative algorithm may be a dynamic programming algorithm.

Figure 7:
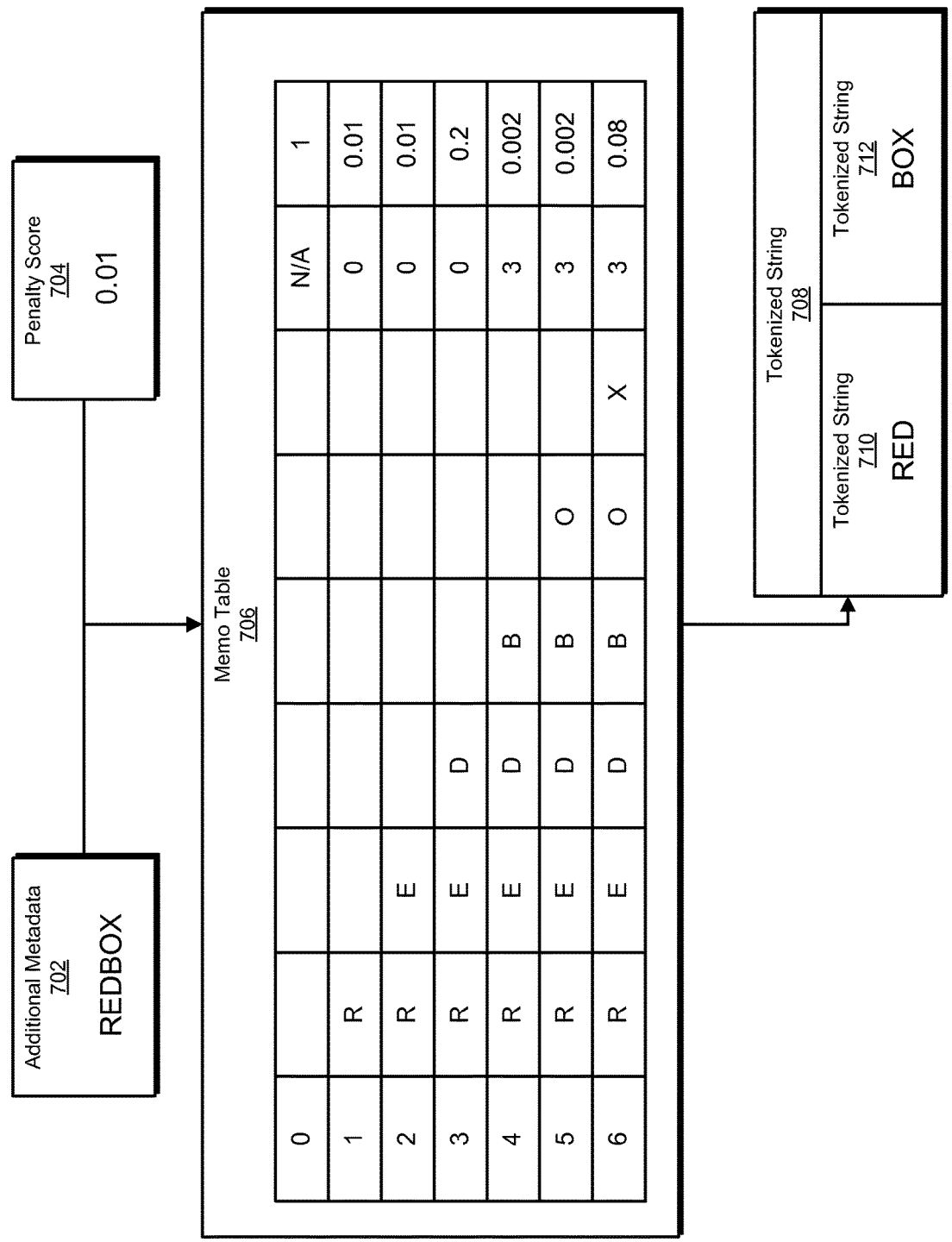
FIG. 7 is a block diagram of an exemplary work flow for identifying the optimal splitting scheme to tokenize a user-annotated name.

Semantic analysis of a string may be performed in a variety of ways. With reference to FIG. 7, tokenizing module 108 may receive additional metadata 702, a penalty score 704, and custom dictionary 406. In the example of FIG. 7, penalty score 704 is a user-defined value of 0.01. Additional metadata 702 may be part of a corpus that is distinct from or overlapping with the example set of metadata, so long as the example set of metadata contains entries that are representative of the corpus or useful when tokenizing elements of metadata from the corpus. Tokenizing module 108 may attempt to split additional metadata 702 into tokens.

In some embodiments, tokenizing module 108 may attempt to perform a preliminary split of a user-annotated name before performing the semantic analysis. In some examples, tokenizing module 108 may split additional metadata 702 along hard delimiters prior to performing semantic analysis on additional metadata 702. In other examples, tokenizing module 108 may split additional metadata 702 according to a regular expression prior to performing semantic analysis on additional metadata 702.

Tokenizing module 108 may follow an algorithm as part of splitting a user-annotated name into tokens. Exemplary pseudocode illustrating how tokenizing module 108 may determine the optimal way to split a string in an iterative fashion is shown in Table 1 below. Exemplary pseudocode illustrating how tokenizing module 108 may determine the optimal way to split a string in a recursive fashion is shown in Table 2 below. Exemplary pseudocode for interpolating a frequency value of a string is shown in Table 3 below.

TABLE 1

Finding An Optimal Split Pattern Iteratively

```
Populate row 0 of a memo table with the empty string, frequency = 1, and no splits recorded
/* memo table here is similar to a memo table 706 in FIG. 7, with a column indicating split
position, and another column indicating the frequency score of the optimal split pattern for that
row */
for L from [1 . . . string length] /* each iteration corresponds to a row in the memo table */
{
    for C from [0 . . . L-1],
    /* C corresponds to columns, and this loop creates C permutations, where the split
    location (e.g., where the multiplication * occurs) varies at position C, for example C = 0
    splits on the left of the whole string, effectively no split, C = 1 splits after the first
    character, C = 2 splits after the second character, etc.*/
    {
        table_score_lookup[L] = table_score_lookup[(left.length)] * freq_lookup(right)
        /*
        left = the characters on the left side of the substring split at position C
        right = the characters on the right side of the substring split at position C
        table_score_lookup[X] is the optimal combined frequency score stored at the
```

TABLE 1-continued

Finding An Optimal Split Pattern Iteratively

```
        frequency score column for row X
        string.length( ) returns the length of a substring
        freq_lookup(substring) returns the dictionary frequency score lookup for the
        entire substring, without any internal splits
        */
    }
    Save the greatest score of the above permutations at the combined frequency score
    column in row L of the memo table, and save the split location at the split location column
    in row L of the memo table
}
Select the last row of the memo table /* the entry that represents the whole string */
while not at row 0 of the memo table /* i.e., the left side of the split still contains characters: */
}
    Add the split recorded in the current row of the memo table to the list of splits.
    R = length of the left side of the split
    Move to row R of the memo table /* corresponds to the left side of the split */
}
Return the list of splits and return the combined frequency score stored in the last row of the
table
```

TABLE 2

Finding an Optimal Split Pattern Recursively

```
bestSplit (input = string S of length L, output = score, list of splits)
{
    if L = 0, return (score = 1; position = leftmost position);
    /* leftmost position = no split */
    else for C from [0 . . . L-1], generate:
    /*generate L permutations, where each permutation has the form: */
    {
        bestSplit(left)*freq_lookup(right)
        /* where the split location (e.g., where the multiplication *
occurs)
            varies at position C, for example C = 0 splits on the left of the
            whole string, effectively no split, C = 1 splits after the first
            character, C = 2 splits after the second character, etc.
            left = the characters on the left side of the substring split at
            position C
            right = the characters on the right side of the substring split at
            position C freq_lookup(substring) = the dictionary frequency
            score lookup for the entire substring, without any internal splits
        */
    }
    add the split with the greatest score from these options to the list
    of splits return the greatest score from these options and the list of
    splits
}
```

TABLE 3

Interpolating a Score

```
If string length is 0, return 1
Else
{
    Receive a list of D dictionaries
    Receive a list of weights for each dictionary
    total_score = 0
    for d [1 . . . D] in list of dictionaries
    {
        match string to an entry in dictionary[d]
        if no match found, score = weight[d]*penalty score
        else score = weight[d]*(score for matched entry in
        dictionary[d])
        add score to total score
    }
    return total_score
}
```

Although implemented in different ways, the algorithms detailed in Table 1 and Table 2 above operate on the same core principles. In either case, tokenizing module 108 may work through all possible single splits of a string to be tokenized, generating a total number of permutations equal to the length of the string. For example, tokenizing module 108 may generate six permutations for a string containing six characters, such as "RedBox". For each permutation, tokenizing module 108 may calculate a frequency score of the permutation. Tokenizing module 108 may calculate the frequency score by multiplying the frequency score for the left side of the split by the frequency score for the right side of the split. In the case of Table 1, tokenizing module 108 may have calculated the frequency score for the left side of the split in a previous iteration and stored the results in a memo table. In this case, tokenizing module 108 may retrieve the frequency score stored in the memo table and use this frequency score as part of calculating the combined frequency score. In the case of Table 2, tokenizing module 108 may recursively call the splitting algorithm, using the left side of the split as an input to the recursive call. In this instance, tokenizing module 108 may use the output of the recursive call as part of calculating the combined frequency score.

The algorithms above are merely exemplary. One will recognize that other algorithms using variations of loops (for, while, until, etc.), increments/decrements, conventions, and orders (left-to-right or right-to-left), etc., are equivalent and achieve the same purpose using essentially the same functionality.

Note further that in either case, the empty string, " ", may return a frequency score of 1, which does not change the total combined frequency score. This is important for edge cases, such as when tokenizing module 108 attempts to split a string containing only a single character. In these cases, tokenizing module 108 may use the empty string as one side of the split, and an interpolated frequency score for the single character. Because the empty string has a frequency value of 1, and frequency scores may be calculated by multiplying the score for the left side of the split by the right side of the split, the frequency score for a single character "split" may effectively be the frequency score of the single character.

Both implementations of the splitting algorithm may utilize the interpolation function illustrated in Table 3 to calculate a frequency score for the right side of the split. Tokenizing module 108 may calculate an interpolation score for a term across a list of dictionaries, each with an assigned weight. A dictionary weight may be a number between 0 and 1, inclusive, such that the sum of all the dictionary weights is equal to 1. A dictionary weight reflects the percentage of the final score that a particular dictionary will contribute. For example, a dictionary with a weight of 0.9 will contribute 90% of the final interpolated score. Tokenizing module 108 may iterate across the list of dictionaries, and search each dictionary for a term that matches the string for which it is interpolating the frequency score. If tokenizing module 108 finds an entry that matches the string in a dictionary, tokenizing module 108 may multiply the dictionary weight by the frequency score for the entry, and add the resulting value to a total interpolated score for the term. If tokenizing module 108 is unable to find an entry that matches the string in a particular dictionary, tokenizing module 108 may multiply the dictionary weight by a penalty score, and add the resulting value to the total interpolated score. Note that if a term is not found in any of the available dictionaries, the final combined score assigned to that term may be equal to the penalty score. Once tokenizing module 108 has searched every dictionary in the list and added the resulting scores to the total interpolated score, tokenizing module 108 may return the total interpolated score to the procedure that called the interpolation algorithm.

Returning to the algorithms presented in Table 1 and Table 2, one of the split permutations may receive the greatest combined frequency score. Note that although the split permutations at any level may contain only a single split, the left side of the split may contain further subdivisions that may be extracted in a variety of ways.

In the case of the iterative algorithm illustrated in Table 1, tokenizing module 108 may extract the full split pattern by first examining the last row of the memo table. The last row of the memo table represents the full string being tokenized. The single split recorded in the last row of the memo table may represent the farthest right useful split of the string. Tokenizing module 108 may store the split recorded at the last row of the memo table in a list of splits. Then, tokenizing module 108 may examine the left side of the split and move up the memo table to the row that corresponds to the left side of the split. Again, tokenizing module 108 may store the previously recorded split location in the list of splits, examine the left side of the split, and move up the memo table to the corresponding row. Tokenizing module 108 may repeat this process until it examines row 0 of the memo table, at which point tokenizing module 108 may return the list of splits.

For example, tokenizing module 108 may attempt to tokenize the string, "REDBOXGREEN". The last row in the memo table generated by this process may identify the split, "REDBOX/GREEN", where slashes denote the position of a split. Tokenizing module 108 may then accordingly search the memo table for the entry corresponding to "REDBOX". The memo table may identify the split, "RED/BOX", and tokenizing module 108 may accordingly search the memo table for the entry corresponding to "RED". The memo table entry for "RED" may record the split, "/RED", i.e., the empty string on one side of the split and "RED" on the other side of the split. At this point, tokenizing module 108 may exit searching the memo table because it attempted to search the memo table for the empty string, and return the final tokenization of "REDBOXGREEN" into "RED/BOX/GREEN".

In the case of the recursive algorithm illustrated in Table 2, the top-level function call of bestSplit( ) may identify the single split permutation with the greatest frequency score based on a function call of bestSplit( ) that uses the left side of the split as an input, which in turn uses a function call of bestSplit( ) that uses the left side of the subsidiary split as an input, and so on, until bestSplit( ) receives the empty string as an input. Note that the higher level function calls of bestSplit( ) cannot resolve which permutation at their level received the greatest frequency score until all lower level calls of bestSplit( ) have resolved. In this manner, each level of recursion need only add the location of its split to a list of splits and pass this list to the next highest level in order to communicate the optimal splitting pattern to the original call of bestSplit( ).

The top level in the chain of bestSplit( ) calls that resolves with the greatest frequency score may accordingly return a list containing the locations of the optimal splits. For example, tokenizing module 108 may call bestSplit (REDGREENBOX). bestSplit(REDGREENBOX) may call 11 more instances of bestSplit( ) each instance representing a different split permutation. One instance of bestSplit( ) at this level may be bestSplit(REDGREEN), which may in turn call seven instances of bestSplit( ) with each instance representing a different split permutation. One such instance may be bestSplit(RED), which may in turn call three instances of bestSplit( ) One of these instances may be bestSplit(" "), or the best split of the empty string, which may return 1 and no split, permitting bestSplit(RED) to resolve as the highest scoring permutation within its level. The various instances of bestSplit( ) may continue to resolve in a similar fashion until the original call of bestSplit( ) resolves and returns that the string "REDGREENBOX" should be split after the third and eighth characters. Tokenizing module 108 may utilize this information to produce the tokenization, "RED/GREEN/BOX," where slashes represent split locations.

Returning to the example of FIG. 7, tokenizing module 108 may implement one of the algorithms described above as part of tokenizing additional metadata 702. For example, tokenizing module 108 may implement the iterative algorithm illustrated in Table 1. Tokenizing module 108 may accordingly generate memo table 706 and populate row 0 of the memo table with the empty string, no splits, and a frequency score of 1. Tokenizing module 108 may then begin iterating through the string, "REDBOX", as illustrated in additional metadata 702.

At the first step of the iteration, tokenizing module 108 may examine only the first character of additional metadata 702, i.e., the character "R". As per the algorithm described above in Table 1, tokenizing module 108 may generate all possible permutations of splitting the string being examined. In the case of the single character "R", there is only one possible split permutation: ""/R", where the slash represents the location of the split. Tokenizing module 108 may then proceed to calculate a frequency score for the split permutation, where the left side of the split is the empty string, and the right side of the split is the character "R". Tokenizing module 108 may locate information pertaining to the left side of the split, i.e., the empty string, in row 0 of memo table 706, and accordingly use the recorded frequency score of 1 as the frequency score for the left side of the split permutation.

Tokenizing module 108 may also calculate an interpolation score for the right side of the split, as per the algorithm detailed in Table 3, using custom dictionary 406 as the only available dictionary, with a dictionary weight of 1. The interpolation algorithm may accordingly search custom dictionary 406 for an entry matching "R". As shown in FIG. 4, custom dictionary 406 does not contain an entry that matches "R", and so the interpolation algorithm may accordingly use penalty score 704, i.e., 0.01, as the frequency score for "R" in custom dictionary 406. Because in this example, the interpolation algorithm is only searching a single dictionary, the interpolation algorithm may add 0.01, multiplied by the dictionary weight of 1, to the previous total score of 0, and return the new total score of 0.01 to tokenizing module 108.

Tokenizing module 108 may now calculate the combined frequency score for ""/R" by multiplying the frequency score of the left side of the split (i.e., the empty string, with frequency score equal to 1) by the frequency score for the right side of the split (i.e., 0.01) to yield a final combined frequency score of 0.01. Because there is only one permutation at this step of the semantic analysis, the sole permutation is the permutation with the highest frequency score in the set of permutations at this step in the iteration. Tokenizing module 108 may accordingly record, at row 1 of memo table 706, that the string "R" should be split at position 0 (i.e., not split) with a frequency score of 0.01.

Tokenizing module 108 may then iterate through the string by incrementing the length of the string being examined, and may accordingly analyze the first two characters of additional metadata 702 (i.e., "RE"). Tokenizing module 108 may, according to the iterative algorithm detailed in Table 1 above, generate the permutations of splits for "RE". "RE" may be split in two ways: "R/E" and ""/RE". Tokenizing module 108 may accordingly calculate two combined frequency scores, one for "R/E", and one for ""/RE". Tokenizing module 108 may search memo table 706 for previous solutions to the left side of each split. In the case of "R/E", the string "R" is one character long, and tokenizing module 108 may accordingly search row 1 of memo table 706 for information pertaining to "R". Tokenizing module 108 may find that the optimal solution for "R" has a frequency score of 0.01, as indicated in row 1 of memo table 706. In the case of ""/RE", tokenizing module 108 may search for information pertaining to the empty string. The empty string contains zero characters, and tokenizing module 108 may accordingly search row 0 of memo table 706 for information pertaining to the empty string. Tokenizing module 108 may find that the empty string has a frequency value of 1, as indicated in row 0 of memo table 706.

Tokenizing module 108 may then interpolate scores for the right side of each split (i.e., for "RE" and "E") according to the interpolation algorithm illustrated in Table 3 above. The interpolation algorithm may search custom dictionary 406 for an entry matching "RE". As shown in FIG. 4, custom dictionary 406 does not contain an entry that matches "RE", and so the interpolation algorithm may accordingly use penalty score 704, i.e., 0.01, as the frequency score for "RE" in custom dictionary 406. Because in this example, the interpolation algorithm is only searching a single dictionary, the interpolation algorithm may add 0.01 to the previous total score of 0 for "RE", and return the final total score of 0.01 to tokenizing module 108. Tokenizing module 108 may call the interpolation algorithm again to acquire a frequency score for "E". Tokenizing module 108 may receive a penalty frequency score of 0.01 for "E" as "E" does not match any entries in custom dictionary 406.

Tokenizing module 108 may calculate combined frequency scores for each split permutation. In general, a combined frequency score is calculated by multiplying the score for the left side of the split (i.e., the combined frequency score for the optimal split of the left side, including any internal splits) by the score for the right side of the split (i.e., the dictionary frequency lookup score for the right side, without any internal splits), with each score being retrieved or calculated as described above.

Tokenizing module 108 may continue to iterate through additional metadata 702, examining the first three, then the first four, the first five, and finally all six characters of "REDBOX". At each step, tokenizing module 108 may generate N split permutations, where N is the length of the substring being examined (i.e., three permutations at the third step, four permutations at the fourth step, etc.). For each iteration, tokenizing module 108 may select the highest scoring permutation from the set of generated permutations, then record the split location and frequency score for the highest scoring permutation in memo table 706. Finally, tokenizing module 108 may iterate to the next character in additional metadata 702.

As part of the third iteration (i.e., analyzing "RED"), tokenizing module 108 may attempt to calculate a frequency score for the substring permutation, ""/RED". As before, tokenizing module 108 may retrieve and use the frequency score for the empty string from row 0 of memo table 706. When calculating the interpolation score for "RED", the interpolation algorithm may locate a matching entry for "RED" in custom dictionary 406. The interpolation algorithm may accordingly retrieve and use the recorded frequency score in custom dictionary 406 as part of calculating the interpolation score for "RED", resulting in a final interpolated frequency score of 0.2. Tokenizing module 108 may use this final interpolated value to determine that the split pattern ""/RED" may have a combined frequency score of 0.2. This permutation may receive the highest combined frequency score of all permutations in the third iteration, and tokenizing module 108 may accordingly store the position of the split (i.e., position 0, or no split) and the frequency score of 0.2 in the third row of memo table 706.

Tokenizing module 108 may, after a number of iterative steps, calculate a frequency score for the entire string of additional metadata 702 (i.e., "REDBOX"). At this point, tokenizing module 108 has already calculated the optimal splitting patterns and associated frequency scores for every substring that begins with the first letter of the string. Tokenizing module may generate a total of 6 split permutations as part of calculating the frequency score for "REDBOX": ""/REDBOX", "R/EDBOX", "RE/DBOX", "RED/BOX", "REDB/OX", and "REDBO/X". Note that in each case, memo table 706 already contains an entry for the substring on the left side of the split that details the optimal split permutation of the substring along with the associated frequency score. Accordingly, tokenizing module 108 need only retrieve this information to calculate the combined frequency scores for the permutations at the current step of the iteration rather than perform the calculations again.

In the third permutation of the sixth and final iteration (i.e., RED/BOX), tokenizing module 108 may retrieve the split pattern and frequency score for "RED" from memo table 706, and may further locate "BOX" within custom dictionary 406 in accordance with the interpolation algorithm detailed in Table 3 above. Memo table 706 may return a frequency score of 0.2 for "RED", and custom dictionary 406 may return a frequency score of 0.4 for "BOX. Tokenizing module 108 may multiply these scores together to yield a combined frequency score of 0.08, calculated as 0.2 from "RED" multiplied by 0.4 from "BOX". This split permutation may receive the highest combined frequency score out of the six permutations analyzed in this iteration. Tokenizing module 108 may accordingly store the split location and combined frequency score in the corresponding row of memo table 706 (row 6 for the sixth iteration). Finally, because tokenizing module 108 cannot iterate past the end of a string, tokenizing module may exit the analysis of additional metadata 702 and begin retrieving the calculated optimal split pattern from memo table 706.

Once tokenizing module 108 has analyzed the complete contents of a string, tokenizing module 108 may retrieve the optimal split pattern from the generated memo table, starting at the last row of the memo table. In the example of FIG. 7, tokenizing module 108 may begin this process at row 6 of memo table 706. Tokenizing module 108 may retrieve information from row 6 of memo table 706 that indicates a split after the third character of the string, into RED/BOX. Tokenizing module 108 may accordingly store split location 3 in a list of splits, then search memo table 706 for the left side of the split, i.e., RED. RED is three characters long, so tokenizing module 108 may accordingly search row 3 of memo table 706 for the optimal splitting pattern of RED. Row 3 indicates that the best way to split RED is at the 0'th position, i.e., into the empty string and RED. Tokenizing module 108 may accordingly terminate its search for more split positions because no further characters remain to be assigned into tokens. As part of step 306(*b*) in FIG. 3, tokenizing module 108 may use the list of split positions (in this case, the list contains one entry for split location 3) to split REDBOX after the third character into a tokenized string 708, containing a tokenized string 710 ("RED") and a tokenized string 712 ("BOX").

Although memo table 706 is shown in FIG. 7 as a table, the information recorded in memo table 706 may take a variety of forms. In some examples, frequency scores may be calculated by a recursive function in a "top-down" approach that calls itself multiple times in a nested fashion to identify the final optimal split pattern. In this case, each layer of the recursive function may return information to the next highest level instead of storing the information in a table or database. In other examples, memo table 706 may be a two dimensional array of data instead of a table. In further examples, memo table may be a set of nested arrays of data, or any other suitable data structure.

As described above, the systems and methods described herein may enable a computing device to tokenize user annotations in a convention-agnostic fashion by creating a customized dictionary based on an analysis of a set of example data, and using the custom dictionary to make informed decisions on how to split a user-annotated name into tokens. The systems and methods may additionally or alternatively make use of an additional dictionary to further inform optimal splitting schemes.

Figure 8:
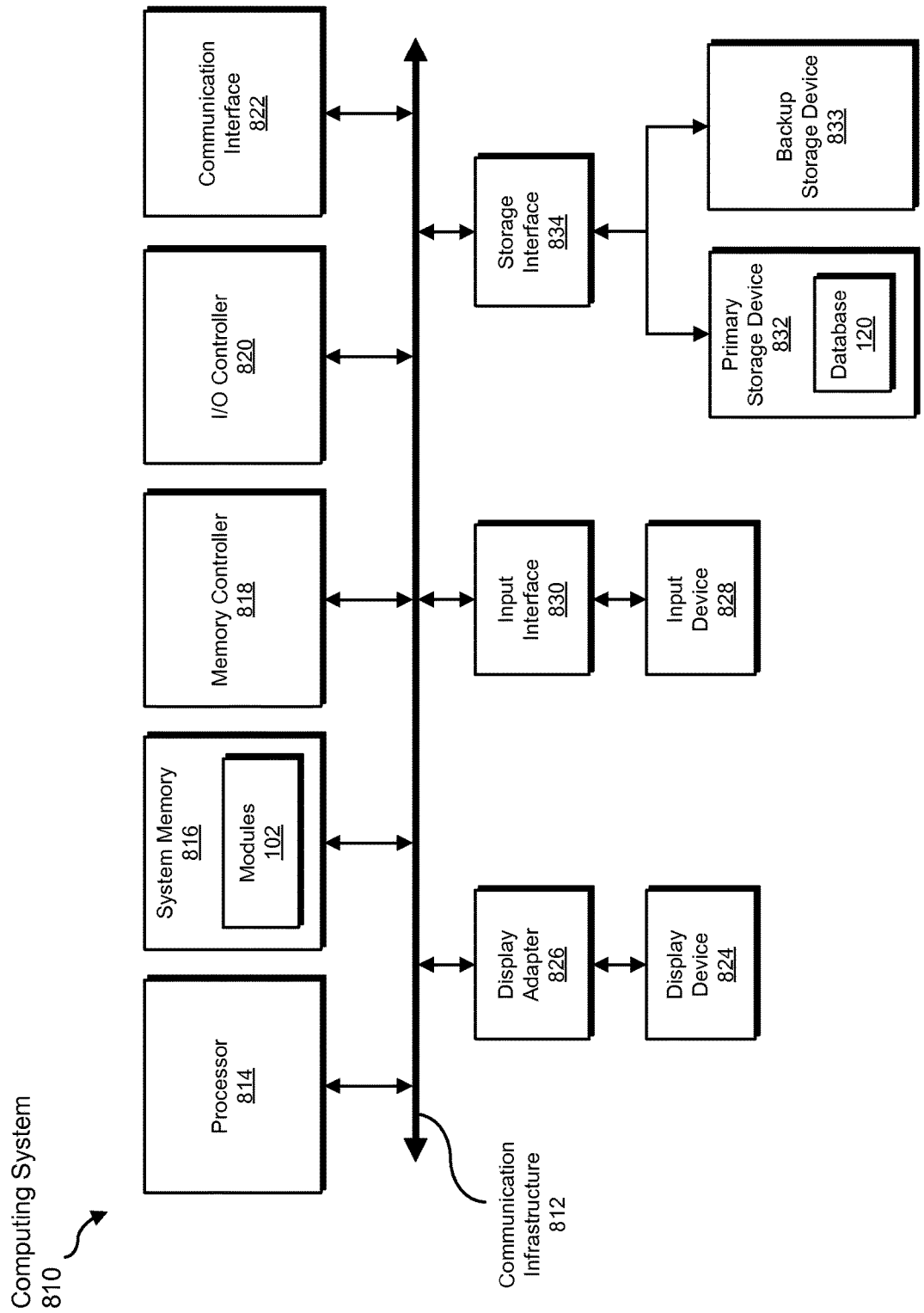
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions.

Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
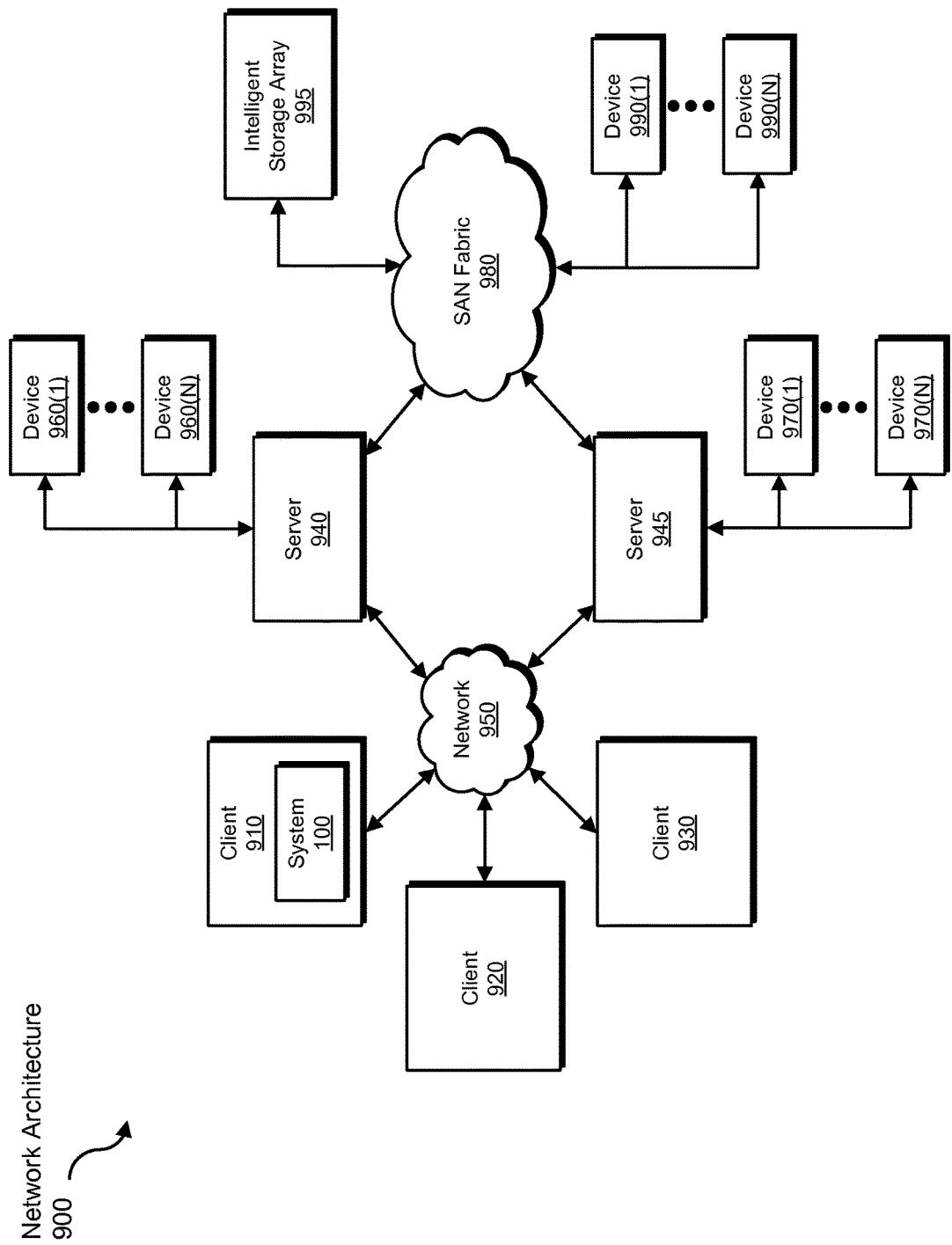
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for tokenizing user-annotated names.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a set of example metadata, transform the set of metadata into a custom dictionary with frequency values for each entry, and store the custom dictionary in a database. One or more of the modules described herein may additionally or alternatively receive an additional element of metadata, transform the additional element of metadata into a collection of tokens, store a result of the transformation to a database, output a result of the transformation to a search function, and/or output a result of the search function to a user interface device such as a monitor. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for tokenizing user-annotated names, at least a portion of the method being performed by a computing device comprising at least one processor, the method comprising:
   identifying an example set of user-annotated names that represent strings of text used to identify digital entities within a particular organization;
   creating, based on the example set of user-annotated names, a custom dictionary that comprises known keywords by:
      extracting a set of known keywords from the example set of user-annotated names;
      assigning, based on the respective frequency of each of the known keywords within the example set of user-annotated names, a frequency score to each known keyword in the set of known keywords that represents a frequency at which the known keyword appears within the example set of user-annotated names;
   enabling the computing device to tokenize an additional user-annotated name of arbitrary structure by performing a semantic analysis comprising:
      applying a tokenization algorithm that, at each iterative step of the tokenization algorithm:
         accepts a text string as a string input;
         generates each possible single split of the string input, generating a total number of permutations equal to the length of the string input;

uses, as an input to a current iterative step in the tokenization algorithm, a previous output of the tokenization algorithm that used one side of the single split as a previous string input to the tokenization algorithm; and assigns, using the custom dictionary, a frequency score to the other side of the single split based on whether the substring matches a known keyword stored in the custom dictionary; and splitting the additional user-annotated name into tokens according to an output of the tokenization algorithm that used the additional user-annotated name as an initial input and received a top combined frequency score, thereby enabling a computing system to process the additional user-annotated name according to the tokens produced as the output of the tokenization algorithm.

2. The method of claim 1, wherein creating the custom dictionary that comprises known keywords further comprises splitting each entry in the example set of user-annotated names stored in metadata along hard delimiters into preliminary keywords.

3. The method of claim 2, wherein creating the custom dictionary that comprises known keywords further comprises adding preliminary keywords that match a regular expression to the custom dictionary that comprises known keywords.

4. The method of claim 3, wherein the regular expression defines at least one of the following sequences:
all alphanumeric capital letters;
all alphanumeric lowercase letters;
a single alphanumeric capital letter followed by a series of alphanumeric lowercase letters.

5. The method of claim 2, wherein the hard delimiters consist of non-alphanumeric characters.

6. The method of claim 1, wherein creating the custom dictionary that comprises known keywords further comprises identifying an additional dictionary that comprises known keywords.

7. The method of claim 6, wherein assigning, using the custom dictionary, a frequency score for a known keyword to a substring of the additional user-annotated name further comprises applying a weighted interpolation function, wherein the weighted interpolation function:
assigns a dictionary weight value to the custom dictionary and an additional dictionary weight value to the additional dictionary;
merges, based on the weight value and the additional weight value, the frequency scores for the known keyword from the custom dictionary and the additional dictionary into a merged frequency score.

8. The method of claim 6, wherein the additional dictionary that comprises known keywords comprises one of:
a natural language dictionary;
a dictionary of user-defined known keywords;
a previously generated custom dictionary of known keywords.

9. The method of claim 1, wherein splitting the additional user-annotated name into tokens comprises applying a function to a substring that uses a previous output of the function as an input to the function.

10. The method of claim 1, wherein the semantic analysis further comprises assigning a penalty score as the frequency score of a substring that is not found in the custom dictionary that comprises known keywords.

11. A system for tokenizing user-annotated names, the system comprising:

an identification module, stored in memory, that identifies an example set of user-annotated names that represent strings of text used to identify digital entities within a particular organization;

a dictionary creation module, stored in memory, that creates, based on the example set of user-annotated names, a custom dictionary of known keywords by:
extracting a set of known keywords from the example set of user-annotated names;
assigning, based on the respective frequency of each of the known keywords within the example set of user-annotated names, a frequency score to each known keyword in the set of known keywords that represents a frequency at which the known keyword appears within the example set of user-annotated names;

a tokenizing module, stored in memory, that enables a computing device to tokenize an additional user-annotated name of arbitrary structure by performing a semantic analysis comprising:
applying a tokenization algorithm that, at each iterative step of the tokenization algorithm:
accepts a text string as a string input;
generates each possible single split of the string input, generating a total number of permutations equal to the length of the string input;
uses, as an input to a current iterative step in the tokenization algorithm, a previous output of the tokenization algorithm that used one side of the single split as a previous string input to the tokenization algorithm; and
assigns a frequency score to the other side of the single split based on whether the substring matches a known keyword stored in the custom dictionary;
splitting the additional user-annotated name into tokens according to an output of the tokenization algorithm that used the additional user-annotated name as an initial input and received a top combined frequency score, thereby enabling a computing system to process the additional user-annotated name according to the tokens produced as the output of the tokenization algorithm;

at least one physical processor configured to execute the identification module, the dictionary creation module, and the tokenizing module.

12. The system of claim 11, wherein the dictionary creation module further creates the custom dictionary of known keywords by splitting each entry in the example set of user-annotated names stored in metadata along hard delimiters into preliminary keywords.

13. The system of claim 12, wherein the dictionary creation module further creates the custom dictionary of known keywords by adding preliminary keywords that match a regular expression to the custom dictionary of known keywords.

14. The system of claim 13, wherein the regular expression defines at least one of the following sequences:
all alphanumeric capital letters;
all alphanumeric lowercase letters;
a single alphanumeric capital letter followed by a series of alphanumeric lowercase letters.

15. The system of claim 12, wherein the hard delimiters consist of non-alphanumeric characters.

16. The system of claim 11, wherein the dictionary creation module further creates the custom dictionary of known keywords by identifying an additional dictionary that comprises known keywords.

17. The system of claim 16, wherein the dictionary creation module further assigns, using the custom dictionary, a frequency score for a known keyword to a substring of the additional user-annotated name by applying a weighted interpolation function, wherein the weighted interpolation function:
- assigns a dictionary weight value to the custom dictionary and an additional dictionary weight value to the additional dictionary;
- merges, based on the weight value and the additional weight value, the frequency scores for the known keyword from the custom dictionary and the additional dictionary into a merged frequency score.

18. The system of claim 16, wherein the additional dictionary that comprises known keywords comprises one of:
- a natural language dictionary;
- a dictionary of user-defined known keywords;
- a previously generated custom dictionary of known keywords.

19. The system of claim 11, wherein the tokenizing module further splits the additional user-annotated name into tokens by applying a function to a substring that uses a previous output of the function as an input to the function.

20. A non-transitory computer-readable medium comprising one or more computer-readable instructions that, when executed by at least one processor of a computing device, cause the computing device to:
- identify an example set of user-annotated names that represent strings of text used to identify digital entities within a particular organization;
- create, based on the example set of user-annotated names, a custom dictionary that comprises known keywords by:
  - extracting a set of known keywords from the example set of user-annotated names;
  - assigning, based on the respective frequency of each of the known keywords within the example set of user-annotated names, a frequency score to each known keyword in the set of known keywords that represents a frequency at which the known keyword appears within the example set of user-annotated names;
- enable tokenization of an additional user-annotated name of arbitrary structure by performing a semantic analysis comprising:
  - applying a tokenization algorithm that, at each iterative step of the tokenization algorithm:
    - accepts a text string as a string input;
    - generates each possible single split of the string input, generating a total number of permutations equal to the length of the string input;
    - uses, as an input to a current iterative step in the tokenization algorithm, a previous output of the tokenization algorithm that used one side of the single split as a previous string input to the tokenization algorithm; and
    - assigns, using the custom dictionary, a frequency score to the other side of the single split based on whether the substring matches a known keyword stored in the custom dictionary; and
  - splitting the additional user-annotated name into tokens according to an output of the tokenization algorithm that used the additional user-annotated name as an initial input and received a top combined frequency score, thereby enabling a computing system to process the additional user-annotated name according to the tokens produced as the output of the tokenization algorithm.

* * * * *